G. REIDER.
TIRE.
APPLICATION FILED SEPT. 8, 1921.
1,411,516.
Patented Apr. 4, 1922.
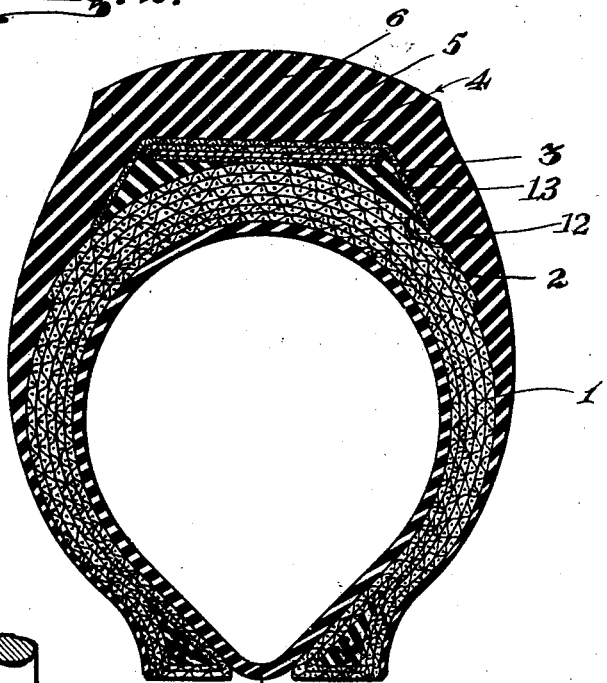
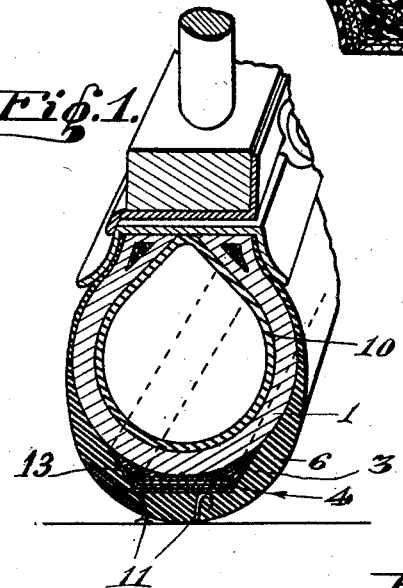
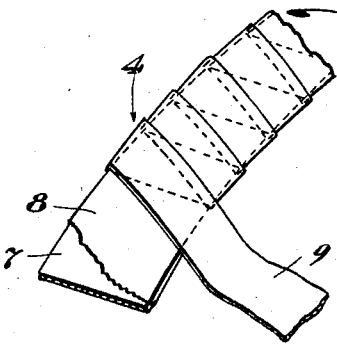
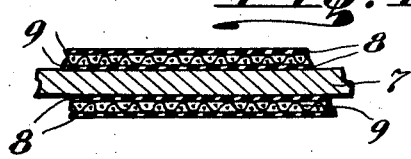
INVENTOR:
George Reider,
BY
ATT'Y

UNITED STATES PATENT OFFICE.

GEORGE REIDER, OF LOS ANGELES, CALIFORNIA.

TIRE.

1,411,516.  Specification of Letters Patent.  Patented Apr. 4, 1922.

Application filed September 8, 1921. Serial No. 499,214.

*To all whom it may concern:*

Be it known that I, GEORGE REIDER, a citizen of the Republic of Russia, residing at Los Angeles, in the county of Los Angeles and State of California, have invented new and useful Improvements in a Tire, of which the following is a specification.

My invention relates to pneumatic tires, and consists of the novel features herein shown, described and claimed.

My object is to make a pneumatic tire puncture proof.

Fig. 1 is a fragmentary cross sectional perspective of a puncture proof pneumatic tire in accordance with the principles of my invention, the tire being shown on a rim as in use.

Fig. 2 is an enlarged cross sectional detail of the tire.

Fig. 3 is a fragmentary perspective of the puncture proof spring steel band and fabric wrapping.

Fig. 4 is a fragmentary enlarged sectional view of the wrapped band.

The fabric tire casing 1 may be any of the usual constructions. The inner fabric breaker strip 2 is applied to the tread portion of the casing 1. The tread gum rubber filler 3 is applied to the breaker strip 2. The wrapped spring steel band 4 is applied to the rubber filler 3. The outer fabric breaker strip 5 is applied to cover the band 4 and the filler 3 and the tread gum rubber 6 is applied to cover the whole tire.

Especial attention is called to the wrapped spring steel band 4. A strip of spring steel 7 of the desired width and thickness is cut to the proper length to fit the filler 3 and the ends of the strip are butt welded together to form a continuous hoop. A coating of suitable cement 8 is applied to the hoop all around. A strip 9 of suitable fabric is wound spirally around the hoop with the edges of the fabric overlapping. The wrapping may be saturated with and covered with suitable cement before it is wound upon the hoop, or the wrapped band may be covered with the cement after the wrapping is done. It is important that the parts be of the proper nature to thoroughly vulcanize together so that the hoop is a fixed part of the tire and when the proper material is used and properly treated this result is obtained.

The steel band 4 is preferably flat transversely, and the filler 3 is built up or formed to conform thereto, and is provided at its sides with inclined walls 12. The outer breaker strip 5 is formed of such width that its edges provide flaps 13 which are lapped over the inclined walls 12 of the filler and brought to the inner breaker strip so that when the tread 6 is applied a lateral anchorage will be provided for the band. The flaps extending obliquely into the side portions of the tire also serve to oppose pulling away of the band at the upper portion of the tire when the latter is in place on the wheel rim and subjected to a load.

The puncture proof wrapped band may be applied in building new tires or it may be applied in retreading old tires.

It is obvious that the steel hoop 7 cannot be punctured by slivers, glass, nails or the like and that the inner tube 10 is thus protected from puncture. In Fig. 1 I have shown how the hoop 7 turns the nails 11 and keeps them from penetrating the fabric or inner tube. The width of the hoop 7 will be in proportion to the diameter of the inner tube.

Thus I have produced a puncture proof pneumatic tire, and various changes may be made in the details of construction without departing from the spirit of my invention as claimed.

I claim:

1. A pneumatic tire comprising a fabric casing, an inner breaker strip covering the tread of the casing, a filler upon the inner breaker strip, a fabric wrapped steel band upon the filler, an outer breaker strip upon the band and a tread upon another breaker strip, all properly cemented and vulcanized together; said outer breaker strip extending obliquely from the sides of the band into the sides of the casing.

2. In a pneumatic tire, a fabric casing, a filler formed peripherally of said casing having inclined side walls, a metal ring seating on said filler between the sides thereof, a fabric breaker strip formed with side flaps, said breaker strip extending over the band with the side flaps lying on the inclined sides of the filler, and a tread body covering the casing and embedding the breaker strip and band.

GEORGE REIDER.